United States Patent
Perrin et al.

(10) Patent No.: US 8,667,794 B2
(45) Date of Patent: Mar. 11, 2014

(54) VALVE SEAT AND GASKET FOR EXHAUST BYPASS VALVE

(75) Inventors: Jean-Luc Perrin, Girmont (FR); Marylene Ruffinoni, Uxegney (FR); Philippe Renaud, Sanchey (FR); Patrick Masson, Urimenil (FR)

(73) Assignee: Honeywell International Inc., Morristown, NJ (US)

( * ) Notice: Subject to any disclaimer, the term of this patent is extended or adjusted under 35 U.S.C. 154(b) by 282 days.

(21) Appl. No.: 13/150,763

(22) Filed: Jun. 1, 2011

(65) Prior Publication Data

US 2012/0304952 A1    Dec. 6, 2012

(51) Int. Cl.
| | |
|---|---|
| F02D 23/00 | (2006.01) |
| F02B 33/44 | (2006.01) |
| F02B 33/00 | (2006.01) |
| F16K 15/00 | (2006.01) |
| F16K 17/00 | (2006.01) |
| F01L 3/10 | (2006.01) |
| F16K 1/16 | (2006.01) |

(52) U.S. Cl.
USPC ............ 60/602; 60/612; 123/562; 137/527; 137/512.3; 137/512.5; 137/527.4; 251/337; 251/298

(58) Field of Classification Search
USPC .......... 60/602, 612; 123/562; 251/527, 512.3, 251/515.5, 527.4, 337, 298; 137/527, 137/512.3, 515.5, 527.4

IPC .......................................................... F01D 17/12
See application file for complete search history.

(56) References Cited

U.S. PATENT DOCUMENTS

| | | | | |
|---|---|---|---|---|
| 1,917,000 A | * | 7/1933 | Tyden ........................... | 251/298 |
| 2,532,067 A | * | 11/1950 | La Bour ...................... | 137/515.5 |
| 3,334,858 A | * | 8/1967 | Hay .............................. | 251/298 |
| 3,494,589 A | * | 2/1970 | Mumma ....................... | 251/298 |

(Continued)

FOREIGN PATENT DOCUMENTS

| | | | | |
|---|---|---|---|---|
| DE | 4225516 A1 | * | 2/1994 | ............. F16K 31/53 |
| DE | 10149287 A1 | * | 4/2003 | ............. F01D 17/12 |

(Continued)

OTHER PUBLICATIONS

EP Application No. 12168142.3-1603 / 2530275: European Search Report Feb. 25, 2013 (4 pages).

*Primary Examiner* — Thai Ba Trieu

(74) *Attorney, Agent, or Firm* — Brian J. Pangrle

(57) ABSTRACT

An assembly can include a valve seat for an exhaust bypass valve of a serial turbocharger system where the valve seat includes a base portion and a wall portion that extends axially away from the base portion; and a gasket that includes a planar portion that defines a perimeter and a socket disposed interior to the perimeter, where the socket includes a valve seat surface axially recessed from the planar portion and configured to position the seat. In various examples, the valve seat is positioned in the socket of the gasket and fixed to the gasket. Various other examples of devices, assemblies, systems, methods, etc., are also disclosed.

20 Claims, 9 Drawing Sheets

(56) References Cited

U.S. PATENT DOCUMENTS

| | | | |
|---|---|---|---|
| 4,073,473 A | | 2/1978 | Rihm |
| 4,118,008 A | * | 10/1978 | Myers ............................ 251/298 |
| 4,304,255 A | * | 12/1981 | Prince ......................... 137/527.4 |
| 4,427,025 A | * | 1/1984 | Prince ............................ 137/527 |
| 4,730,456 A | | 3/1988 | Tadokoro et al. |
| 5,215,117 A | * | 6/1993 | Petersen et al. ............. 137/512.3 |
| 8,109,257 B2 | * | 2/2012 | An et al. ......................... 123/562 |
| 2007/0169479 A1 | | 7/2007 | Nicolle et al. |
| 2007/0204616 A1 | * | 9/2007 | Martin et al. .................... 60/602 |
| 2008/0178591 A1 | * | 7/2008 | Axelsson et al. ................ 60/602 |
| 2011/0020108 A1 | * | 1/2011 | Axelsson et al. ............... 415/66 |

FOREIGN PATENT DOCUMENTS

| | | | | |
|---|---|---|---|---|
| EP | 1843019 A1 | | 10/2007 | |
| EP | 1626169 B1 | | 2/2008 | |
| EP | 1843019 B1 | | 9/2010 | |
| JP | 57-029875 A | * | 2/1982 | ............. F16K 1/226 |
| JP | 2005-290529 A | * | 10/2005 | ............. C22C 19/00 |
| WO | WO 2007/103860 A2 | | 9/2007 | |
| WO | 2012102854 A2 | | 8/2012 | |

* cited by examiner

VALVE SEAT AND GASKET FOR EXHAUST BYPASS VALVE

TECHNICAL FIELD

Subject matter disclosed herein relates generally to turbomachinery for internal combustion engines and, in particular, to seal mechanisms for exhaust bypass valves.

BACKGROUND

An exhaust bypass valve is often used to control operation of serial turbocharger systems. Such a valve may be operated to physically divert exhaust or alter pressures in exhaust pathways, for example, to direct exhaust flow partially or fully to one of multiple turbines in a system. During operation, a typical exhaust bypass valve experiences high exhaust pressure on one side and lower pressure on the other side. To effectively seal the high pressure environment from the low pressure environment, considerable force is required to maintain contact between a valve and a valve seat. Conventional efforts to provide a robust seal have proven costly and even to deteriorate over time (e.g., due to valve seat oxidation). Various technologies described herein have potential to reduce cost as well as provide for effective exhaust bypass valve sealing.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Figure 1:
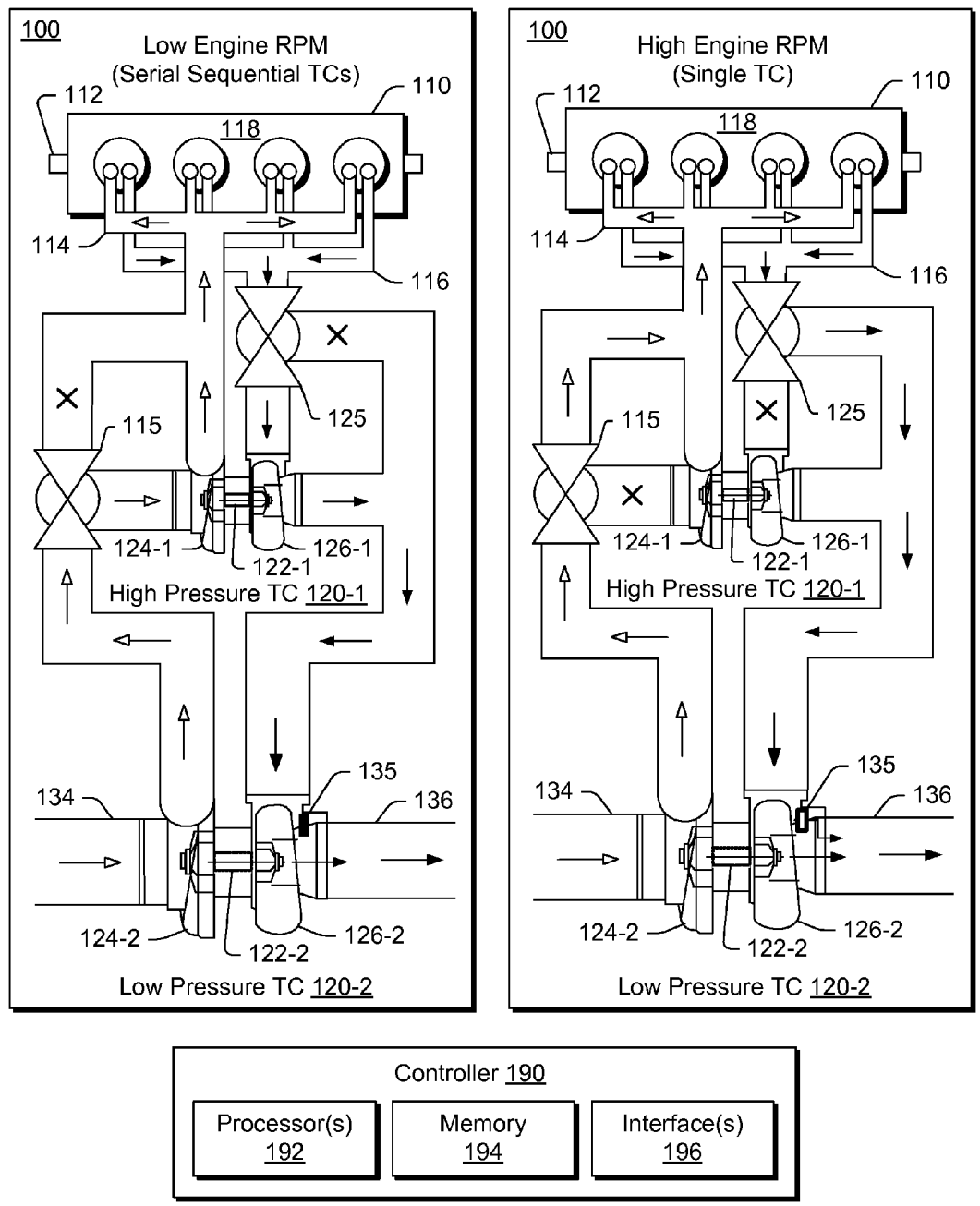
FIG. 1 is a diagram of an example of a system that includes turbochargers and an internal combustion engine along with a controller.

Turbochargers are frequently utilized to increase output of an internal combustion engine. FIG. 1 shows a conventional system 100 in two operational configurations (low engine RPM and high engine RPM) where the system 100 includes an internal combustion engine 110 and turbochargers 120-1 and 120-2 in a serial sequential arrangement.

The internal combustion engine 110 includes an engine block 118 housing one or more combustion chambers that operatively drive a shaft 112 (e.g., via pistons) where rotation of the shaft 112 determines, for example, engine revolutions per minute (RPM). As shown in FIG. 1, an intake manifold 114 provides a flow path for air to the engine block 118 while an exhaust manifold 116 provides a flow path for exhaust from the engine block 118.

Each of the turbochargers 120-1 and 120-2 can act to extract energy from the exhaust and to provide energy to intake air, which may be combined with fuel to form combustion gas. As shown in FIG. 1, each of the turbochargers 120-1 and 120-2 includes a shaft 122-1 and 122-2, a compressor 124-1 and 124-2, and a turbine 126-1 and 126-2. Each of the turbochargers 120-1 and 120-2 may include a housing, which may be referred to as a center housing (e.g., disposed between a respective compressor and turbine). As described herein, a turbocharger shaft may be a shaft assembly that includes a variety of components.

As to fluid flow to and from the serial sequential arrangement of turbochargers 120-1 and 120-2, an air intake 134 receives inlet air, which is directed to the compressor 124-2 and an exhaust outlet 136 receives exhaust from the turbine 126-2, which may include an exhaust wastegate valve 135. The wastegate valve 135 can be controlled to allow exhaust to bypass the turbine 126-2.

In the low engine RPM operational state, the turbochargers 120-1 and 120-2 are operated in series, sequentially. Specifically, exhaust from the exhaust manifold 116 is directed first to the turbine 126-1, which causes rotation of the compressor 124-1, and then to the turbine 126-2, which causes rotation of the compressor 124-2. As the turbine 126-1 extracts energy from the exhaust, the exhaust pressure decreases; therefore, the turbocharger 120-1 is referred to as a high pressure turbocharger while the turbocharger 120-2 is referred to as a low pressure turbocharger for the serial sequential operational state. Further, as indicated in FIG. 1, compressed intake air from the compressor 124-2 is directed to an inlet of the compressor 124-1. Such an arrangement may be referred to as dual-stage compression.

In the low engine RPM operational state, an air valve 115 may be configured in an orientation that directs compressed air from the compressor 124-2 to the inlet of the compressor 124-1 and an exhaust valve 125 may be configured in an orientation that directs exhaust from the manifold 116 to the turbine 126-1. During operation, either or both of the valves 115 and 125 may be regulated. For example, the valve 115 may be regulated such that at least some intake air bypasses the compressor 124-1 and the valve 125 may be regulated such that at least some exhaust bypasses the turbine 126-1. Such regulation may occur while the system 100 is maintained in a serial sequential operational state. In contrast, when the air valve 115 is configured in an orientation that bypasses the compressor 124-1 and when the exhaust valve is configured in an orientation that causes full or significant of the turbine 126-1, the system 100 operates fully or essentially as a single turbocharger system. Such an operational state is typically selected for high engine RPM.

As the high engine RPM operational state relies on the turbocharger 120-2 and as high engine RPM logically follows low engine RPM, regulation of the exhaust valve 125 can act to pilot the low pressure turbocharger 120-2. For example, when a preset engine RPM or boost pressure is reached, a controller may actuate the exhaust valve 125 to increase flow of exhaust to the turbine 126-2 (e.g., via physical diversion or pressure differential). In such a scenario, the increased flow to the turbine 126-2 increases rotational speed of the shaft 122-2, which prepares the turbocharger 120-2 for a more rapid response and power output (e.g., with minimum turbo lag) upon configuration of the exhaust valve 125 in an orientation that causes full or significant bypass of the turbine 126-1.

The system 100 may also include other features, for example, a heat exchanger may be positioned to cool compressed intake air prior to delivery of the compressed air to the combustion chambers of the engine 110. As described herein, the system 100 may include one or more exhaust gas recirculation paths that can circulate exhaust to intake air; noting that exhaust valves and intake valves for combustion chambers of the engine 110 may be appropriately controlled to achieve some degree of exhaust "recirculation" (e.g., retention in a chamber).

In FIG. 1, an example of a controller 190 is shown as including one or more processors 192, memory 194 and one or more interfaces 196. Such a controller may include circuitry such as circuitry of an engine control unit. Such a controller may include circuitry that provides for reading, writing or reading and writing information (e.g., executable instructions, control instructions, data, etc.) to memory (e.g., a computer-readable storage medium). As described herein, various methods or techniques may optionally be implemented in conjunction with a controller, for example, through control logic. Control logic may depend on one or more engine operating conditions. For example, sensors may transmit information to the controller 190 via the one or more interfaces 196. Control logic may rely on such information and, in turn, the controller 190 may output control signals to control engine operation. The controller 190 may be configured to control an air valve (see, e.g., the air valve 115), an exhaust valve (see, e.g., the exhaust valve 125), a variable geometry assembly, a wastegate (see, e.g., the wastegate 135), an electric motor, or one or more other components associated with an engine, an exhaust turbine (or exhaust turbines), a turbocharger (or turbochargers), etc. With respect to valves, the controller 190 may be configured to act as an actuator or to transmit a signal to an actuator configured to actuate, for example, the air valve 115, the exhaust valve 125, the wastegate valve 135 (e.g., to close or open a wastegate), etc.

Figure 2:
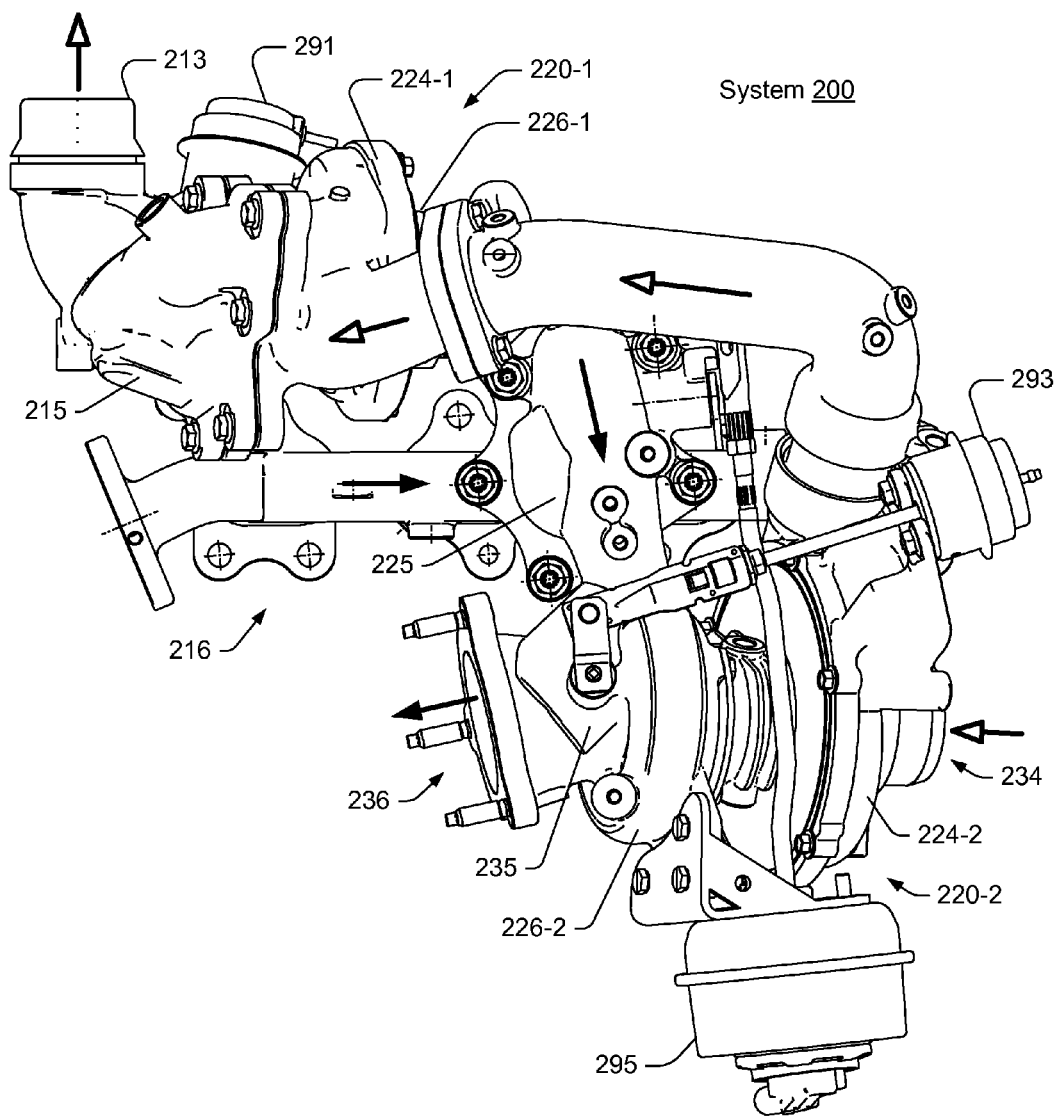
FIG. 2 is a perspective view of an example of a serial sequential turbocharger system.
Figure 3:
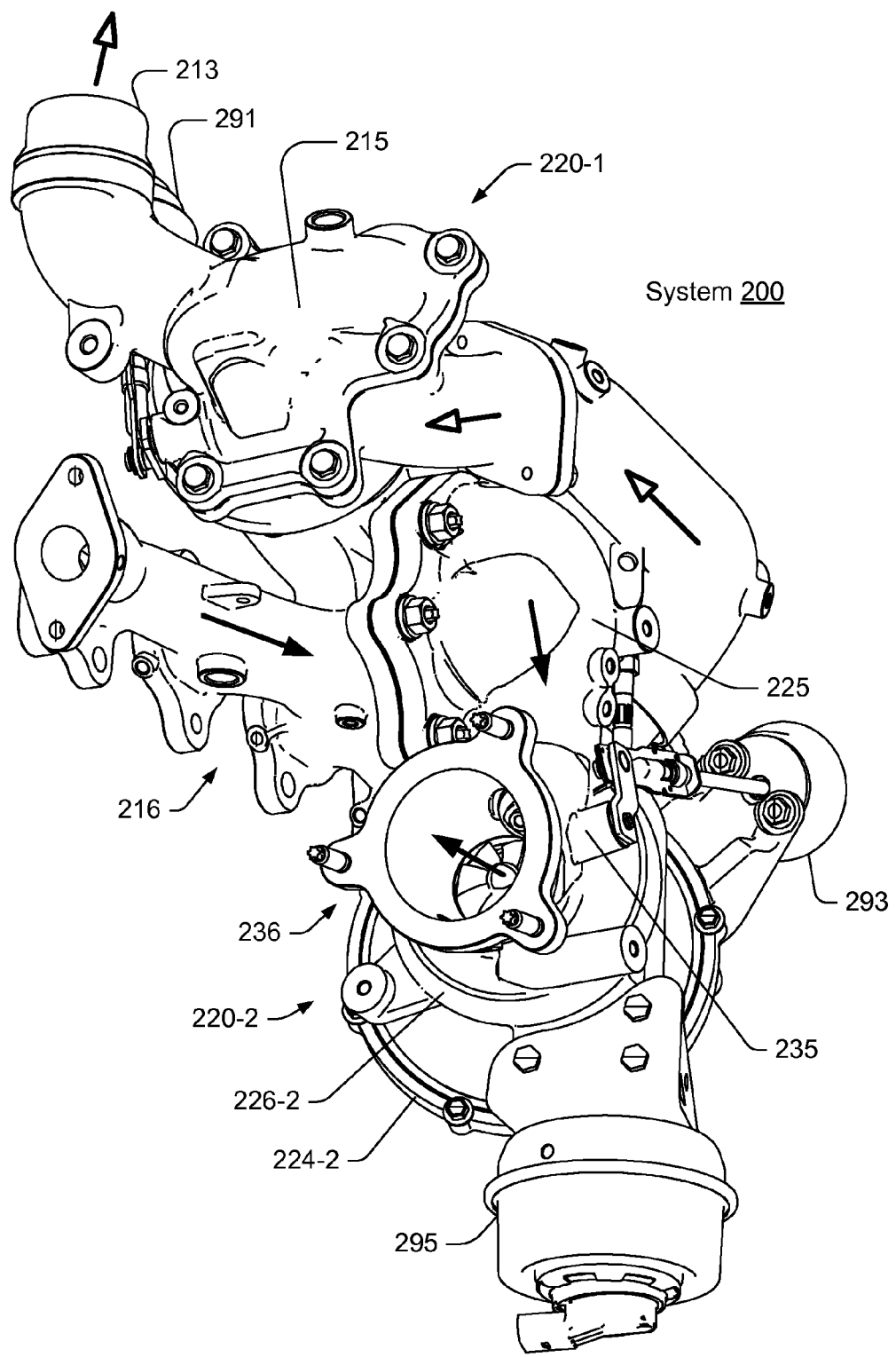
FIG. 3 is another perspective view of the serial sequential turbocharger system of FIG. 2.

FIGS. 2 and 3 show perspective views of a system 200 with two turbochargers 220-1 and 220-2 along with an air outlet 213, an air valve 215, an exhaust manifold 216, an exhaust valve 225, a wastegate 235, an air intake 234, an exhaust outlet 236, an air valve actuator 291, a wastegate actuator 293 and an exhaust valve actuator 295. Open headed arrows indicate intended air flow directions while solid headed arrows indicate intended exhaust flow directions. Each of the turbochargers 220-1 and 220-2 includes a compressor 224-1 and 224-2 and a turbine 226-1 and 226-2.

As described herein, a system capable of serial sequential turbocharger operation and single turbocharger operation may be arranged in any of a variety of manners. For example, an exhaust valve may be located in a variety of positions depending on number, shape and size of exhaust conduits. In general, an exhaust valve acts to cause flow of exhaust predominantly to a larger of the turbochargers, which is often referred to as a low pressure turbocharger in a serial sequential arrangement. As mentioned, an exhaust valve may act to physically bypass a smaller, high pressure turbocharger or it may act to alter pressure in pathways. As to the latter, with reference to the system 200, the exhaust valve 225 may be located adjacent the exhaust manifold 216 such that upon opening of the valve 225, exhaust flows along a lower pressure pathway to the larger turbine 226-2 of the low pressure turbocharger 220-2. In such an arrangement, the exhaust valve 225 can regulate exhaust flow form a high pressure source (e.g., manifold) to a lower pressure pathway.

As described herein, exhaust valve regulation may occur such that an exhaust valve is closed, open or in any intermediate state. In general, a valve opens in a direction facilitated by a pressure differential and closes in a direction opposed to the pressure differential. Such a valve arrangement provides for easier opening (e.g., less actuator force to open) and, upon failure of an actuator, the valve being in an open or partially open state (e.g., which allows flow of exhaust to the larger turbine). If an exhaust valve were arranged such that actuator failure prevented opening, then, at high engine RPM, exhaust would be first directed to the smaller turbine, which could cause overspeed and potential failure of the smaller turbine (or compressor). Ultimately, however, an exhaust valve should be capable of effectively closing an exhaust opening such that, for low engine RPM, exhaust is directed to the smaller turbine.

Figure 4:
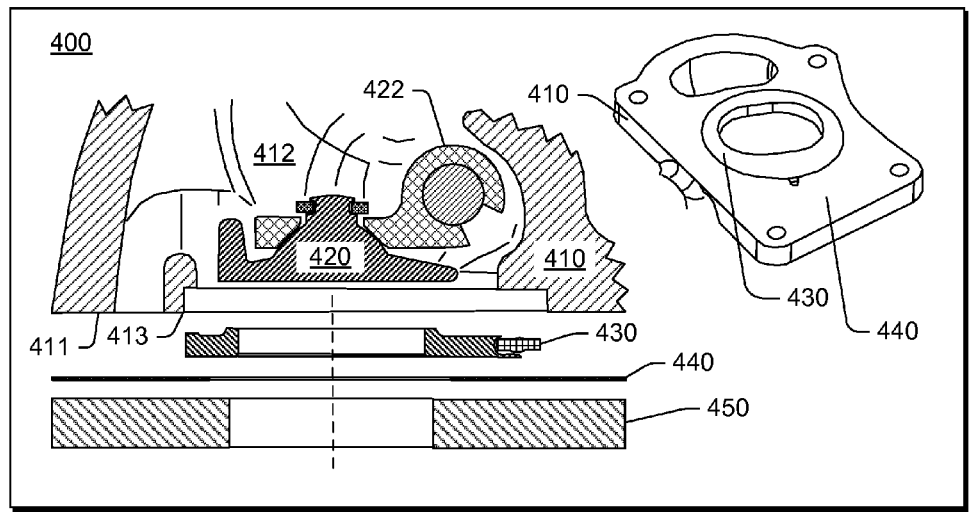
FIG. 4 is a cross-sectional view and a perspective view of an example of a conventional exhaust bypass valve assembly.

FIG. 4 shows an example of a conventional exhaust valve assembly 400. The assembly 400 includes a housing 410 that defines a chamber 412 configured for receipt of exhaust responsive to position of a poppet 420, which is attached to and movable by an arm 422, where the arm 422 may be attached to or linked to an actuator. As described herein, a poppet can act as a plug, for example, to plug or seal an opening. The housing 410 further includes a face 411 with a recess 413 configured for receipt of a seat 430. As shown in FIG. 4, a gasket 440 is configured for positioning between the housing 410 and a component 450 to seal interfaces between the housing 410 and the seat 430 and the component 450.

As described herein, interfaces exist between various items, which are intended to be permanent or temporary and reproducible. For example, interface seals associated with the gasket 440 are intended to be permanent (e.g., unless disassembly is desired); whereas, the interface seal between the poppet 420 and the seat 430 is intended to be temporary and reproducible. Specifically, the seal exists when the exhaust valve is in a closed position and, after opening of the valve and reclosing, the interface seal can be reproduced (e.g., to help ensure consistent control and operation over lifetime of a system).

In conventional assemblies like the assembly 400, a seat is constructed via a process such as casting or metal injection molding from a medium grade material such as a silicon-molybdenum ductile iron material (SiMo ductile iron). For example, consider an iron material with 4% to 5% silicon and 0.5% to 2% molybdenum, which may have a hardness of about 200 BHN to about 260 BHN and elongation of about 5% to 15% and heat resistance up to about 1600 degrees Fahrenheit (about 880 degrees Celsius). However, SiMo ductile iron can experience inter-granular oxidation that can affect seat flatness (e.g., interface characteristics).

As shown in FIG. 4, the gasket 440 is required for sealing interfaces between components (e.g., intended permanent seals). Such a gasket may be a multi-layer metal sheet gasket. A conventional assembly that relies on a SiMo ductile iron and a gasket can be expensive and, over time, experience quality degradation (e.g., due to oxidation, etc.) that affects ability to seal permanent interfaces and temporary interfaces (e.g., controllable or reproducible). Specifically, any change in shape of the seat 430 can affect both the interface seal between the seat 430 and the poppet 420, the seat 430 and the face 411 and the recess 413 and, consequently, between the seat 430 and the gasket 440. Accordingly, changes in the seat 430 can have a detrimental impact on the gasket 400, which may lead to exhaust leakage from a high pressure path defined by the component 450 and the housing 410 (i.e., alternatively or additionally to detrimental leakage past the interface between the seat 430 and the poppet 420). As described herein, changes in sealing ability over time can be quite detrimental to controllability and operability of a system that includes turbochargers.

Further, in the conventional assembly 400 of FIG. 4, the seat 430 may be made of multiple pieces that must be carefully inserted into the housing 410 prior to addition of the gasket 440. Such pieces cannot necessarily be assembled in advance of attaching the component 450 to the housing 410. Yet further, as gaskets are typically thin, they may easily bend if mishandled prior to or during installation. Deformations due to mishandling can impact a gasket's ability to seal.

Figure 5:
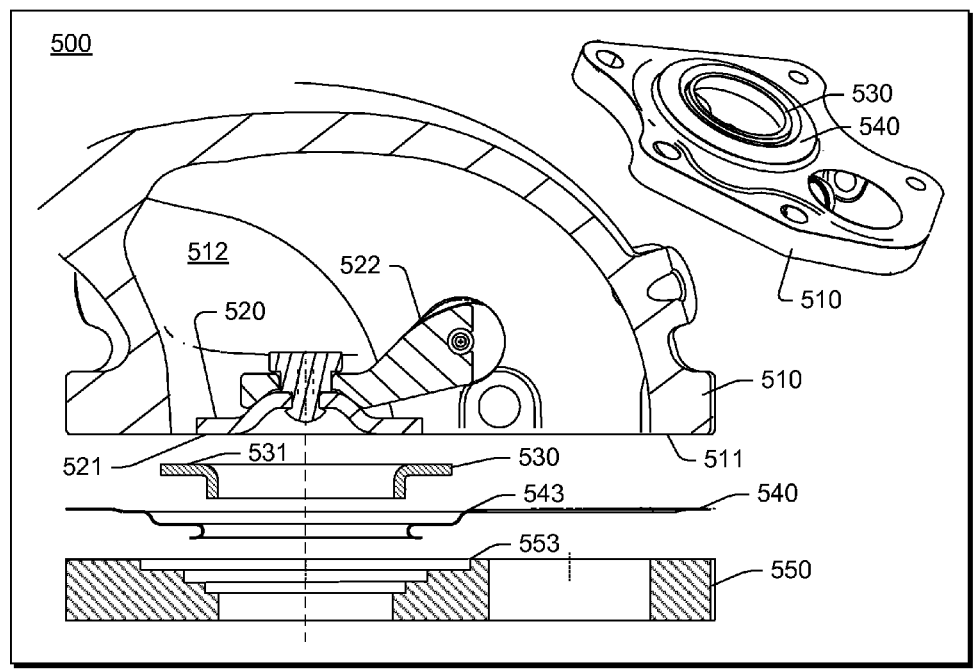
FIG. 5 is a cross-sectional view and a perspective view of an example of an exhaust bypass valve assembly.

FIG. 5 shows an assembly 500 that includes a housing 510 that defines a chamber 512 for housing a poppet 520. The housing 510 includes a planar face 511 where a face 521 of the poppet 520 aligns flush to the planar face 511 when the poppet 520 is in a closed orientation. Per the exploded view of the example of FIG. 5, a gasket 540 includes a socket 543 configured for receipt of a seat 530. Further, a component 550 includes 550 a recess configured for receipt of the socket 543 of the gasket 540. When assembled, for the poppet 520 in a closed orientation, an interface is formed between a face 531 of the seat 530 and the face 521 of the poppet 520.

In such an example, the seat 530 may be constructed from any of a variety of materials while the gasket 540 may be constructed from, for example, a high grade material that experiences less oxidation than SiMo ductile iron. As described herein, a high grade material may be immune to oxidation or otherwise experience limited oxidation that does not have a significant impact on gasket quality and function (e.g., avoiding, limiting or reducing impact on interface characteristics).

As described herein, a valve seat, a gasket or both a valve seat and a gasket may be constructed from an austenitic nickel-chromium-based superalloy (e.g., INCONEL® family of alloys, Special Metals Corporation, New Hartford, N.Y.). Accordingly, in the example of FIG. 5, the valve seat 530, the gasket 540 or both may be made of material that includes nickel and chromium (e.g., greater than about 40% Ni and greater than about 10% Cr).

As described herein, a valve seat, a gasket or both a valve seat and a gasket may be constructed from a process such as stamping. For example, given a sheet of alloy, a stamping process (e.g., using one or more dies) may form perimeters, openings and contours of a gasket or a valve seat. A sheet of stock alloy for a gasket may be of a thickness that is thinner than a sheet of stock alloy for a valve seat. In such an example, the alloys may be the same or different.

As described herein, a valve seat and a gasket may be joined by welding or other fixation process (e.g., physical, chemical, etc.). For example, a valve seat may be positioned in a socket of a gasket and then spot welded to the gasket (e.g., via electron beam, laser beam or other welding process). Electron beam welding (EBW) can be used with minimum distortion due to low total heat input and can accomplish a near-zero joint gap.

As described herein, a valve seat and a gasket may be joined prior to attachment of components to be sealed. For example, the valve seat 530 may be welded to the gasket 540 and then stored as a single part. Upon assembly of a turbocharger system, the part can be retrieved and positioned prior to clamping the part between two components. In such an example, the valve seat can add integrity to the gasket, which may reduce risk of deformation prior to installation or at time of installation. When provided as a single part, assembly time for a turbocharger system may be reduced, for example, when compared to assembly time for a conventional arrangement that relies on the valve seat and gasket parts shown in FIG. 4.

As shown in the example of FIG. 5, the gasket 540 has a substantially planar portion that defines a perimeter, which may be matched to that of the housing 510. Further, the socket 543 is located interior to the perimeter, for example, a distance sufficient to avoid compromising integrity of and ability of the gasket 540 to seal the housing 510 and the component 550 from exhaust leakage.

Figure 6:
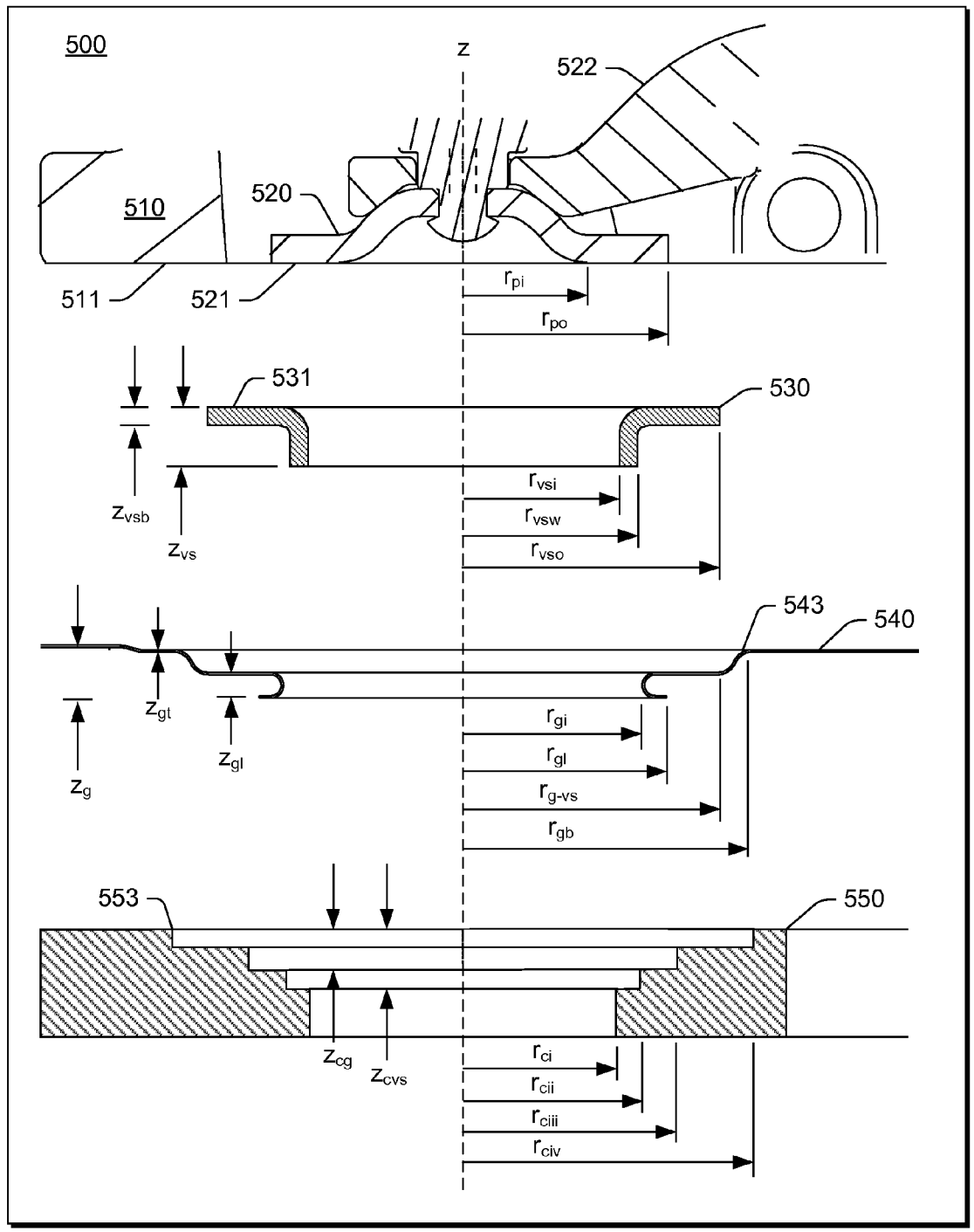
FIG. 6 is an exploded cross-sectional view of the assembly of FIG. 5 with various dimensions.

FIG. 6 shows cross-sections of the housing 510, the poppet 520, the seat 530, the gasket 540 and the component 550 of FIG. 5 along with axial and radial dimensions with respect to a z-axis and an r-axis.

In FIG. 6, the face 521 of the poppet 520 extends from an inner radius $r_{pi}$ to an outer radius $r_{po}$. The face 511 of the housing 510 and the face 521 of the poppet 520 are shown as being aligned along a common axial position. The valve seat (or seat) 530 includes an axial seat height $z_{vs}$ and an axial base thickness $Z_{vsb}$. The seat 530 also includes an inner radius $r_{vsi}$, a wall radius $r_{vsw}$ and an outer radius $r_{vso}$. The gasket 540 includes an axial gasket height $z_g$, an axial lip height $z_{gi}$ and a gasket thickness $z_{gt}$. The gasket also includes an inner radius $r_{gb}$, a lip radius $r_{gl}$, a valve seat radius $r_{g-vs}$ and a base radius $r_{gb}$ (e.g., optionally defining at least part of the socket). The component 550 includes an axial gasket recess height $z_{cg}$ and an axial valve seat height $z_{cvs}$, as well as a series of recess radii: $r_{ci}$, $r_{cii}$, $r_{ciii}$, and $r_{civ}$.

As described herein, an assembly can include a valve seat for an exhaust bypass valve of a serial turbocharger system where the valve seat includes a base portion and a wall portion that extends axially away from the base portion and a gasket that includes a planar portion that defines a perimeter and a socket disposed interior to the perimeter, where the socket includes a valve seat surface axially recessed from the planar portion and configured to position the seat. In such an example, the valve seat can be positioned in the socket and fixed to the gasket (e.g., the valve seat may be positioned in the socket and welded to the gasket). As described herein, a valve seat surface of a gasket can include a lip, a shoulder or a lip and a shoulder. As to a shoulder, in the example of FIG. 6, a shoulder exists between the radii $r_{g-vs}$ and $r_{gb}$, which has an axial height approximately equal to the thickness of the valve seat (e.g., $z_{vsb}$). Such a shoulder may act to position a base portion of a valve seat.

As described herein, a socket of a gasket can include a lip, which may act to position a wall portion of a valve seat. Such a lip may be a curled lip and optionally provide for some resiliency, additional sealing capabilities, etc. As described herein, an assembly can include a valve seat with an outer radius associated with a base portion of the valve seat and an inner radius associated with a wall portion of the valve seat. In cross-section, a valve seat may have an "L" shape, for example, with an annular plate like base portion and a cylindrical wall portion that extends outward from the base portion.

As described herein, a valve seat can have a valve seat thickness and a gasket can have a gasket thickness where the valve seat thickness exceeds the gasket thickness. As shown in the example of FIG. 6, the valve seat thickness is considerably thicker than the gasket thickness (e.g., as the valve seat must accommodate force exerted to maintain the valve in a closed position). As described herein, a valve seat may include silicon and molybdenum or other material(s).

As described herein, a component configured to attach to a housing, such as the housing 510, can include a recess configured to accommodate a socket of a gasket, especially with a valve seat disposed in the socket. In various examples, an exhaust bypass valve of a serial turbocharger system includes a face that can seat against a valve seat for a closed orientation of the exhaust bypass valve (e.g., to seal an exhaust passage defined by one component from an exhaust chamber defined by a housing that houses the valve).

As described herein, a housing may be configured to house an exhaust bypass valve and the housing may include a perimeter that matches a perimeter of the gasket.

Figure 7:
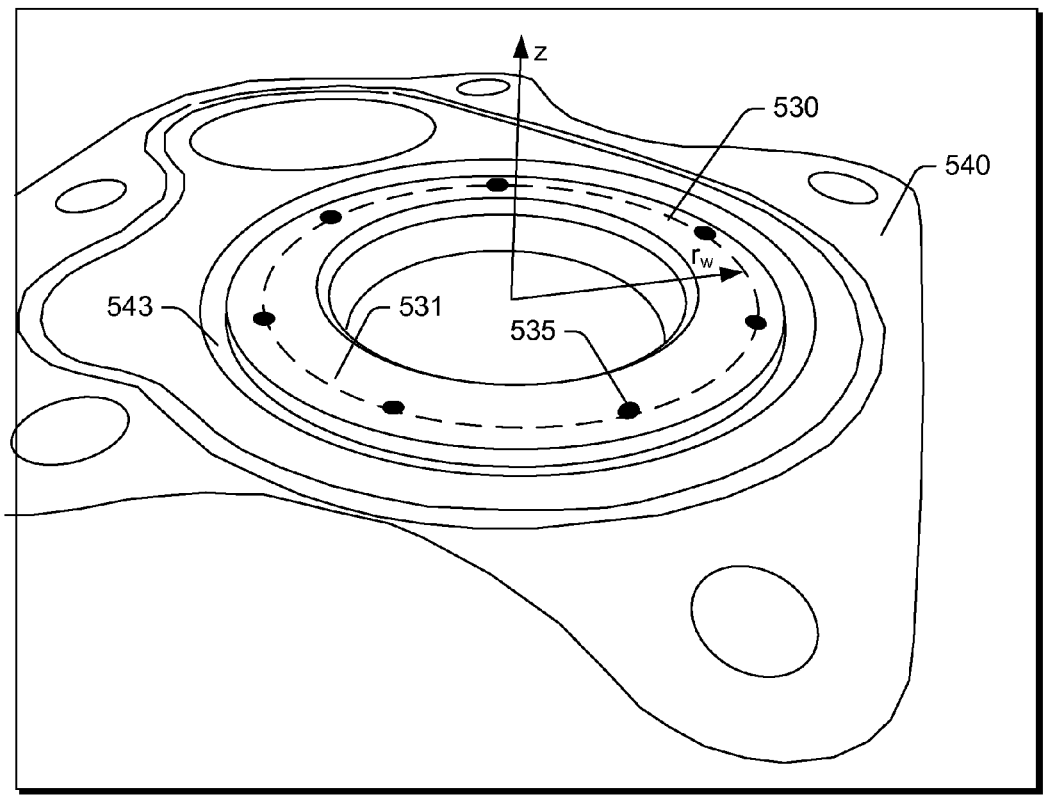
FIG. 7 is a top perspective view and a bottom perspective view of an example of a gasket assembly.
Figure 7:
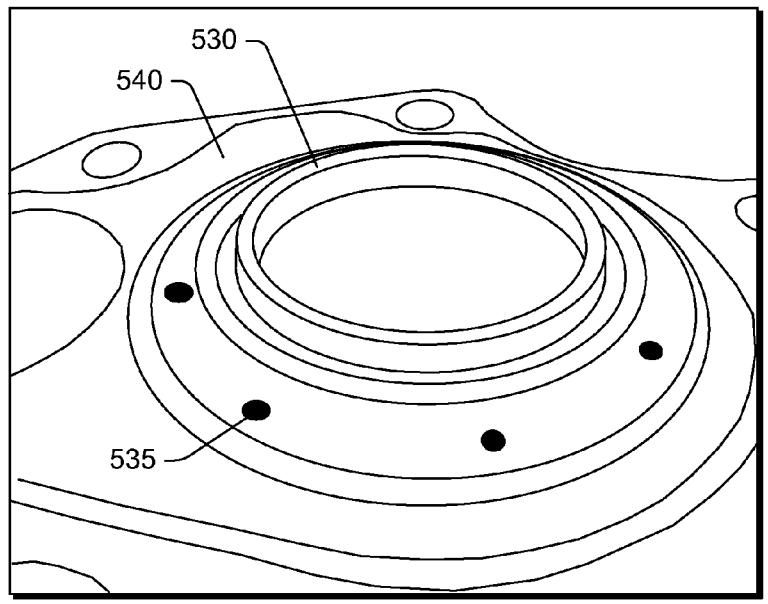

FIG. 7 shows a top perspective view and a bottom perspective view of the valve seat 530 and the gasket 540 joined to form a single part, which may be referred to as a valve seat and gasket assembly. In the example of FIG. 7, the valve seat 530 is positioned by the socket and fixed to the gasket 540. The valve seat and gasket assembly may be made by placing the valve seat 530 in the socket of the gasket 540 and then welding, as indicated by spot weld marks 535. In the example of FIG. 7, the spot weld marks are along the face 531 of the valve seat 530 (e.g., between radii $r_{vsw}$ and $r_{vso}$) and an annular, planar recessed surface of the gasket 540 (e.g., between radii $r_{gi}$ and $r_{g-vs}$). Spot welding may weld align spots along a common radius (e.g., $r_w$), which may be greater than an outer radius of a poppet (e.g., or face thereof) of an exhaust bypass valve (e.g., $r_{po}$), for example, such that interference of sealing ability is not affected or minimized by any weld mark(s) or weld-related deformation(s). Accordingly, in the example of FIG. 7, the radius $r_w$ may exceed a radius, radii or other perimeter dimension(s) of a poppet of an exhaust bypass valve.

Figure 8:
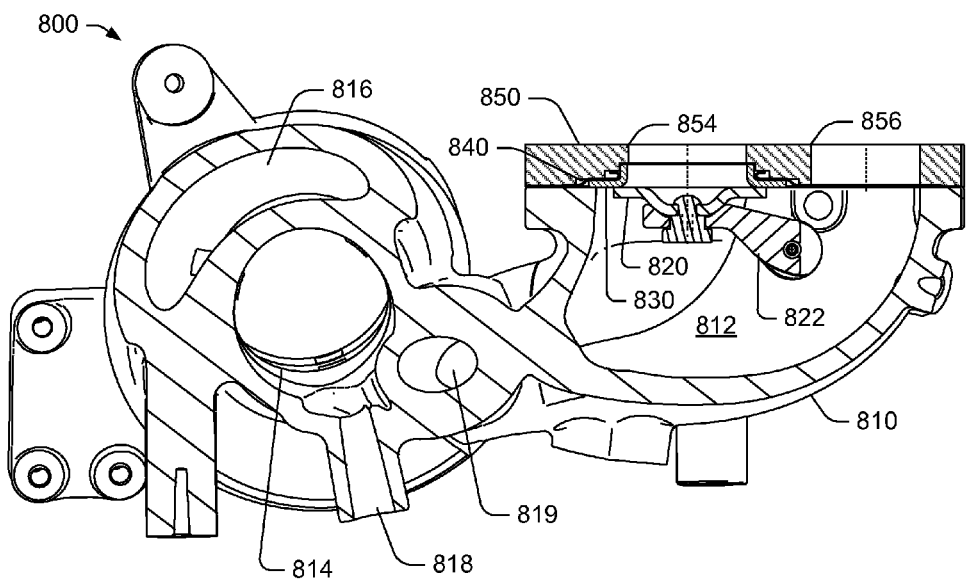
FIG. 8 is a series of cross-sectional views of an example of an assembly.
Figure 8:
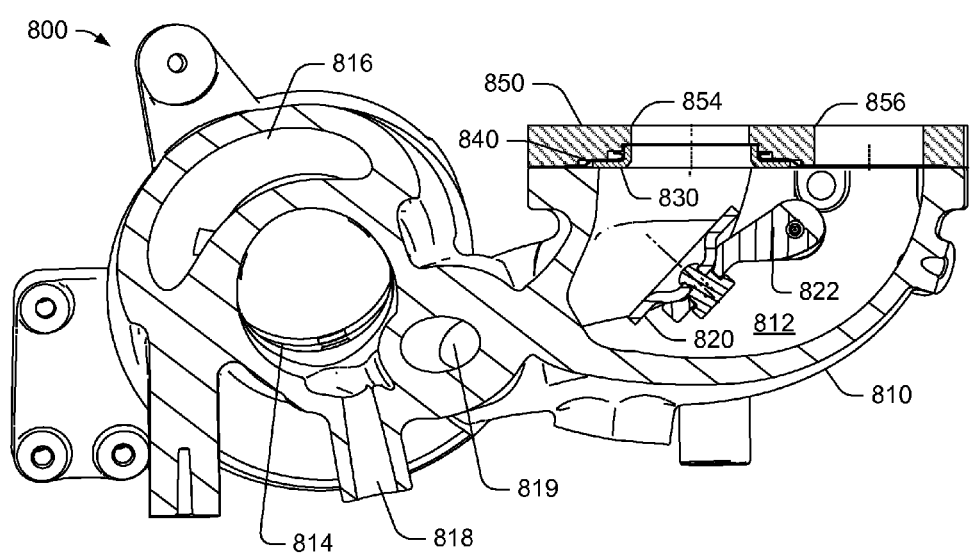

FIG. 8 shows cross-sectional views of an example of a housing assembly 800 that includes a valve seat 830 fixed to a gasket 840. The example of FIG. 8 shows the housing assembly 800 with an exhaust valve poppet 820 in a closed position and in the exhaust valve poppet 820 in an open position.

As mentioned with respect to FIGS. 2 and 3, a housing can be configured to house a turbine such as a low pressure turbine of a serial sequential turbocharger system. In the example of FIG. 8, the housing 810 defines an exhaust chamber 812 that houses a valve arm 822 and the valve poppet 820. The valve seat 830 is fixed in a socket of a gasket 840, which is positioned on the housing 810. Upon rotation of the arm 822 to move the valve poppet 820 to an open position, exhaust can flow into the chamber 812 (e.g., via an opening 854 in a component 850) and to a volute 816 defined by the housing 810. As shown in FIG. 8, the volute 816 directs exhaust to a central bore 814, which is configured for receipt of a turbine (see, e.g., the system 200 as shown in FIG. 3). A sensor may be mounted in a sensor port 818 of the housing 810 (e.g., to measure one or more variables associated with turbine operation). Further, a wastegate may be provided to regulate exhaust via a wastegate opening 819 defined by the housing 810.

In the example of FIG. 8, the housing 810 is configured for receipt of exhaust via one or more openings. As shown, the component 850 includes the opening 854, as associated with the exhaust valve, and another opening 856, which may be for receipt of exhaust from an outlet of a high pressure turbine. As mentioned, in a low engine RPM operational state, where the exhaust valve may be closed, exhaust may flow from an outlet of a high pressure turbine to an inlet of a low pressure turbine. Where a wastegate is provided for the low pressure turbine, it may be opened to divert exhaust from a volute associated with the low pressure turbine. Further, where piloting of the low pressure turbine is desired, a wastegate may remain closed and exhaust from an outlet of a high pressure turbine directed to an inlet to the low pressure turbine. Yet further, an exhaust valve may be modulated to further ramp up speed of the low pressure turbine, for example, with exhaust that bypasses the high pressure turbine.

As described herein, a turbine housing may define a chamber for housing an exhaust valve to regulate supply of exhaust into the housing and define an opening for a wastegate for regulation of supplied exhaust to a volute. Such a turbine housing may include a face for placement of a gasket and valve seat where the gasket includes a socket configured for receipt and fixation of the valve seat. As described herein, such a valve seat can seat a poppet (e.g., plug portion) of an exhaust valve. In the example of FIG. 8, for a closed orientation of the exhaust valve, a face of the poppet 820 of the valve aligns with a face of the seat 830. A component 850 may be attached to the housing 810 to thereby clamp the seat 830 and the gasket 840 between the housing 810 and the component 850 (see, e.g., nuts, bolts, etc., of FIGS. 2 and 3). Such a component may include a recess configured for receipt of the gasket 840 and the seat 830 (e.g., as disposed in the socket of the gasket 840). Further, as mentioned, the component 850 may include more than one opening for receipt of exhaust. Accordingly, where the component 850 includes the openings 854 and 856, the gasket 840 may include associated openings while providing a means to seal interfaces surrounding such openings (e.g., permanently sealed interfaces).

Figure 9:
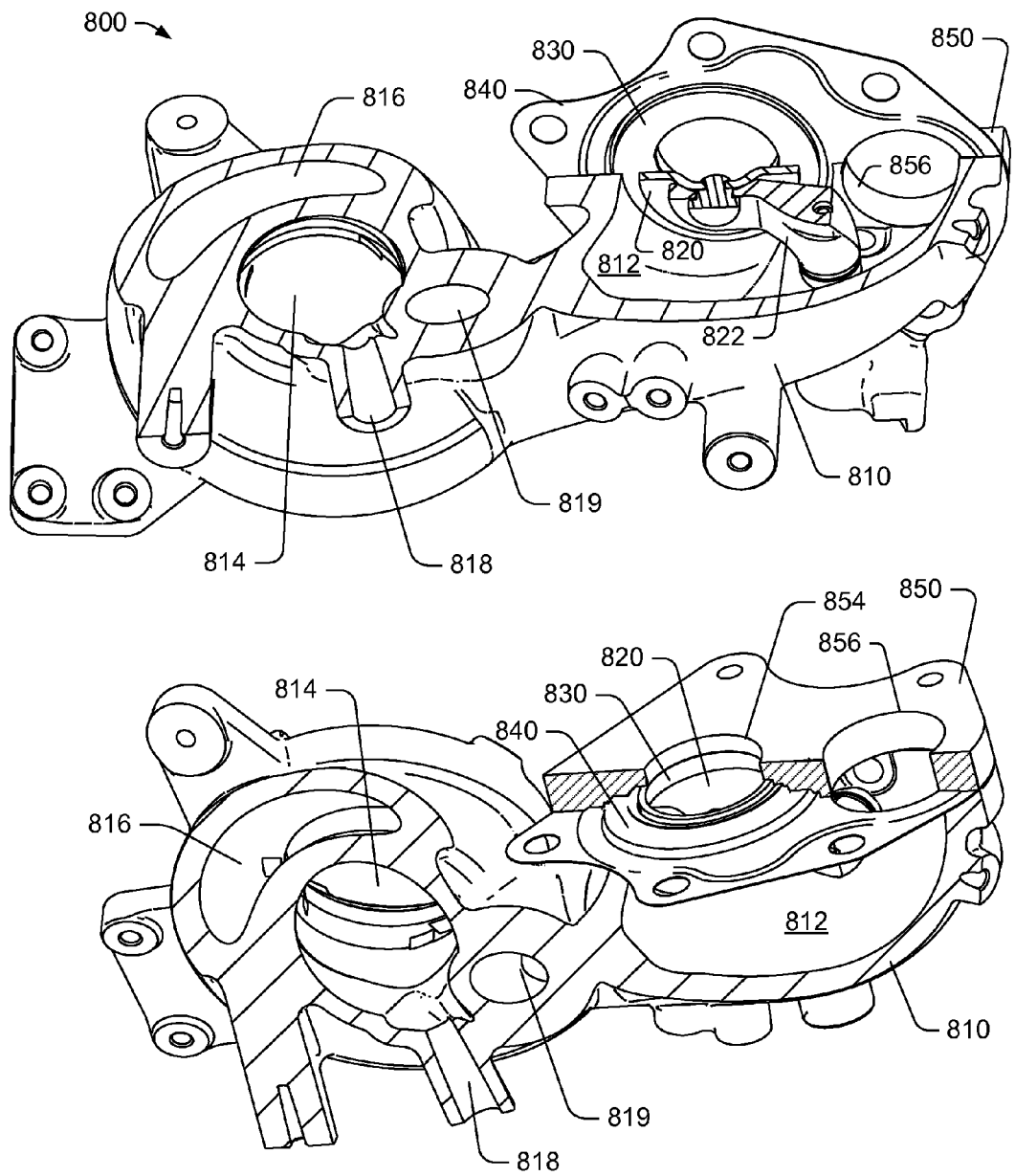
FIG. 9 is a series of cut-away perspective views of the example assembly of FIG. 8.

FIG. 9 shows perspective cut-away views of the housing assembly 800 of FIG. 8. As shown in the example of FIG. 9, the gasket 840 includes apertures for receipt of bolts or other attachment parts to attach the component 850 to the housing 810. The perimeter of the gasket 840 is configured to match that of the housing 810 as well as that of the component 850. As shown in the lower view of FIG. 9, the gasket 840 protrudes a distance away from the housing 810 and the seat 830, as disposed in the socket of the gasket 840, protrudes an even greater distance away from the housing.

As described herein, a component (e.g., the component 850) may include a recess with a surface that limits axial position of a seat disposed in a socket of a gasket (see, lower view of FIG. 9 where seat 830 contacts the component 850). For example, referring to FIG. 6, annular surfaces between various radii of the recess 553 may act to limit a base portion or an end portion of the seat 530. In the example of FIG. 6, the curled lip of the gasket 540 optionally allows for contact (e.g., axially limiting contact) between an end of the seat 530 and the component 550 (e.g., along an annular surface between radius $r_{ci}$ and radius $r_{cii}$). In such an arrangement, any axial forces transmitted from a poppet to a seat may be transferred primarily to a component rather than to a gasket. As clamped between two components (e.g., the housing 810 and the component 850), one or more portions of the gasket 840 may be compressible, for example, such that the gasket 840 contacts and biases surfaces of the two components to improve sealing. Such an approach may benefit longevity and reproducibility of operational characteristics.

While various examples show a gasket configured for an exhaust valve opening and another exhaust opening, as described herein, for other arrangements, a gasket may include a socket for receipt of a seat for seating a poppet of an exhaust valve without any additional exhaust openings.

As described herein, an assembly for a serial sequential turbocharger system can include an exhaust bypass valve with an arm and a poppet; a housing that includes an exhaust chamber configured to house the exhaust bypass valve; a component configured for attachment to the housing where the component includes an exhaust passage; a valve seat fixed to a gasket disposed between the housing and the component where the gasket positions the valve seat with respect to the poppet for an orientation of the exhaust bypass valve that seals the exhaust chamber from the exhaust passage. Further, such a component can include a recess configured to accommodate a socket of a gasket.

As described herein, an assembly can include a housing with a passage to direct exhaust from the exhaust chamber to an inlet of a volute. As mentioned, a housing can include wastegate opening configured to divert exhaust from such a passage. As in the example assembly 800 of FIGS. 8 and 9, a housing may define volute.

Figure 10:
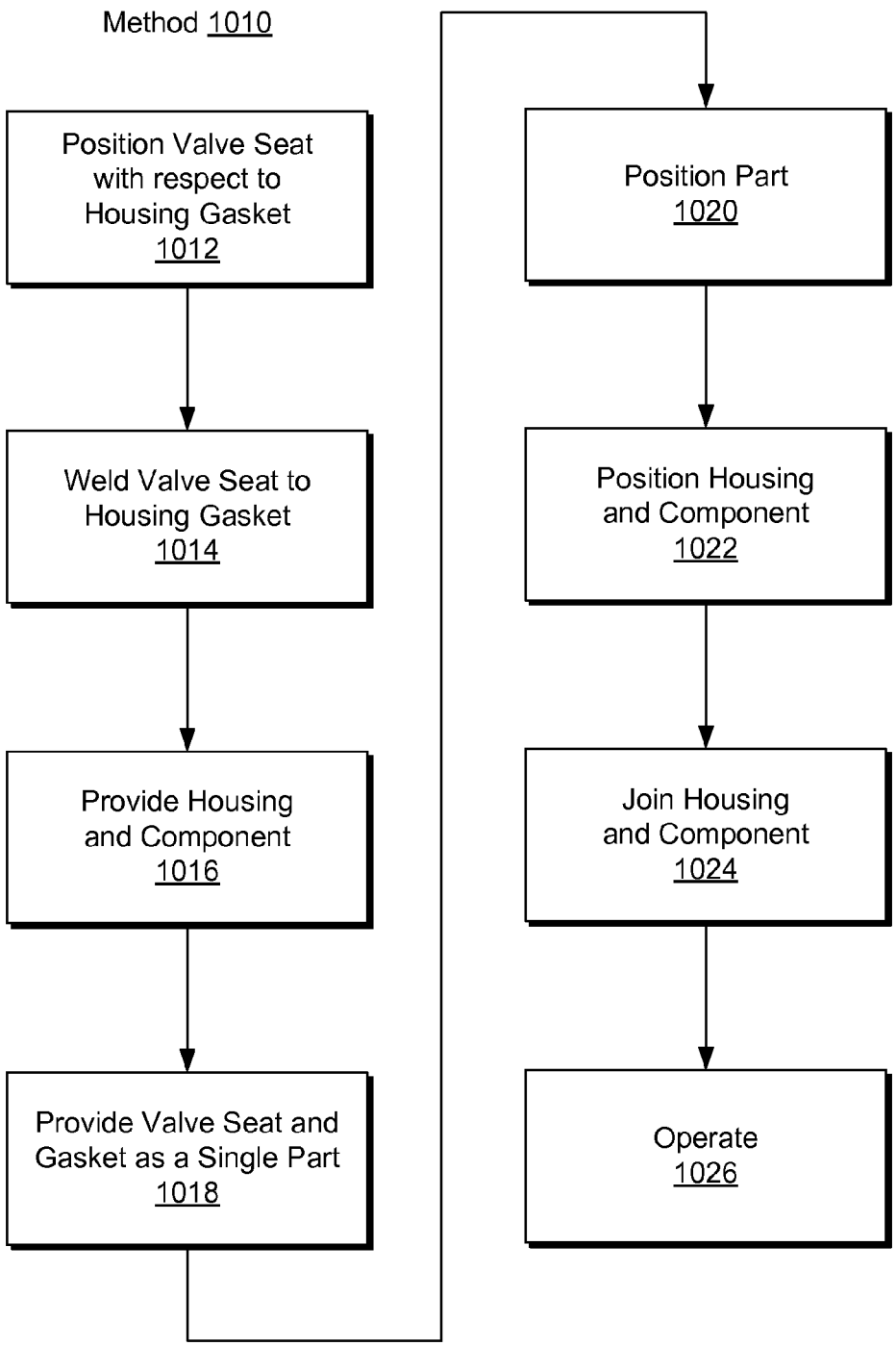
FIG. 10 is a block diagram of some examples of methods.

FIG. 10 shows an example of a method 1010. The method 1010 includes a position block 1012 for positioning a valve seat with respect to a gasket and a weld block 1014 for welding the valve seat to the gasket, for example, to create a single part. Such a part may optionally be stored, shipped, etc., for later use.

In the method 1010, a provision block 1016 provides a housing and a component and another provision block 1018 provides the valve seat and the gasket as a single part. A position block 1020 includes positioning the part with respect to one of the housing and the component. Once positioned, another position block 1022 positions one of the housing and the component with respect to the component or the housing. A join block 1024 includes joining the housing and the component, for example, via one or more of bolts, nuts, etc. Once joined, per an operation block 1026, the housing and the component may be operated, for example, as part of a turbocharger system. The operation block 1026 can include operating an exhaust valve of a turbocharged engine system where the exhaust valve (e.g., poppet or plug portion) abuts the valve seat.

As described herein, the method 1010 may provide an assembled a serial sequential turbocharger system with an exhaust bypass valve sealed by the valve seat as welded to the gasket.

As described herein, a method can include providing a valve seat and a gasket where the gasket includes a socket configured for receipt of the valve seat; positioning the valve seat with respect to the socket of the gasket; fixing the valve seat to the gasket; joining a housing and another component with the gasket and valve seat disposed therebetween to locate the valve seat with respect to an exhaust bypass valve housed by the housing; and sealing an exhaust chamber of the housing from an exhaust passage of the component by contacting the valve seat and the exhaust bypass valve. Such a method may further include positioning the valve seat by contacting an end of the valve seat and a surface of the component. As to fixing, a welding or other process may be used to fix a valve seat to a gasket.

As described herein, a lip of a socket of a gasket can provide for radially positioning a valve seat with respect to the gasket and a recessed surface of a socket of a gasket can provide for axially positioning a valve seat with respect to the gasket.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions without departing from the spirit set forth and defined by the following claims.

What is claimed is:

1. An assembly comprising:
   a valve seat of an exhaust bypass valve of an exhaust turbocharger turbine bypass in a serial turbocharger system for an internal combustion engine,
   wherein the valve seat comprises a base portion and a wall portion that extends axially away from the base portion; and
   a gasket that comprises a planar portion that defines a perimeter and a socket disposed interior to the perimeter, wherein the socket comprises a valve seat surface axially recessed from the planar portion and configured to position the valve seat,
   wherein the valve seat surface of the gasket comprises a lip and a shoulder.

2. The assembly of claim 1 wherein the lip comprises a curled lip.

3. The assembly of claim 1 wherein the valve seat is positioned in the socket and fixed to the gasket.

4. An assembly comprising:
   a valve seat of an exhaust bypass valve of an exhaust turbocharger turbine bypass in a serial turbocharger system for an internal combustion engine,
   wherein the valve seat comprises a base portion and a wall portion that extends axially away from the base portion; and
   a gasket that comprises a planar portion that defines a perimeter and a socket disposed interior to the perimeter, wherein the socket comprises a valve seat surface axially recessed from the planar portion and configured to position the valve seat wherein the valve seat comprises a valve seat thickness and wherein the gasket comprises a gasket thickness wherein the valve seat thickness exceeds the gasket thickness.

5. The assembly of claim 4 wherein the valve seat is positioned in the socket and fixed to the gasket.

6. An assembly comprising:
   a valve seat of an exhaust bypass valve of an exhaust turbocharger turbine bypass in a serial turbocharger system for an internal combustion engine,
   wherein the valve seat comprises a base portion and a wall portion that extends axially away from the base portion; and
   a gasket that comprises a planar portion that defines a perimeter and a socket disposed interior to the perimeter, wherein the socket comprises a valve seat surface axially recessed from the planar portion and configured to position the valve seat,
   wherein the valve seat comprises an outer radius associated with the base portion and an inner radius associated with the wall portion.

7. The assembly of claim 6 wherein the valve seat is positioned in the socket and fixed to the gasket.

8. The assembly of claim 6 wherein the valve seat is positioned in the socket and welded to the gasket.

9. The assembly of claim 6 wherein the valve seat surface of the gasket comprises a lip and a shoulder.

10. The assembly of claim 9 wherein the lip comprises a curled lip.

11. The assembly of claim 6 wherein the valve seat comprises a valve seat thickness and wherein the gasket comprises a gasket thickness wherein the valve seat thickness exceeds the gasket thickness.

12. The assembly of claim 6 wherein the valve seat comprises nickel and chromium.

13. The assembly of claim 6 further comprising a component that comprises a recess configured to accommodate the valve seat as disposed in the socket of the gasket.

14. The assembly of claim 6 further comprising the exhaust bypass valve wherein a face of the exhaust bypass valve seats against the valve seat for a closed orientation of the exhaust bypass valve.

15. The assembly of claim 14 further comprising a housing configured to house the exhaust bypass valve wherein the housing comprises a perimeter that matches the perimeter of the gasket.

16. The assembly of claim 6 further comprising:
- the exhaust bypass valve wherein the exhaust bypass valve comprises an arm and a poppet;
- a housing that comprises an exhaust chamber configured to house the exhaust bypass valve; and
- a component configured for attachment to the housing wherein the component comprises an exhaust passage configured for receipt of internal combustion engine exhaust;
    - wherein the gasket positions the valve seat with respect to the poppet for an orientation of the exhaust bypass valve that seals the exhaust chamber from the exhaust passage.

17. The assembly of claim 16 wherein the housing comprises a passage to direct exhaust from the exhaust chamber to an inlet of a volute.

18. The assembly of claim 17 wherein the housing comprises a wastegate opening configured to divert exhaust from the passage.

19. The assembly of claim 17 wherein the housing defines the volute.

20. The assembly of claim 16 wherein the component comprises a recess configured to accommodate the valve seat as disposed in a socket of the gasket.

* * * * *